United States Patent
Hengst et al.

(10) Patent No.: US 12,123,188 B2
(45) Date of Patent: Oct. 22, 2024

(54) PANEL, SYSTEM, AND USE FOR CONCEALING SOUND ABSORBING SURFACE AND METHOD OF PRODUCING OF THE SAME

(71) Applicant: KNAUF GIPS KG, Iphofen (DE)

(72) Inventors: Klaudius Hengst, Iphofen (DE); Ruth Schnobrich, Würzburg (DE); Klaus Holfelder, Iphofen (DE)

(73) Assignee: KNAUF GIPS KG, Iphofen (DE)

( * ) Notice: Subject to any disclaimer, the term of this patent is extended or adjusted under 35 U.S.C. 154(b) by 607 days.

(21) Appl. No.: 17/414,274

(22) PCT Filed: Dec. 19, 2019

(86) PCT No.: PCT/EP2019/000347
§ 371 (c)(1),
(2) Date: Jun. 15, 2021

(87) PCT Pub. No.: WO2020/126069
PCT Pub. Date: Jun. 25, 2020

(65) Prior Publication Data
US 2022/0018121 A1    Jan. 20, 2022

(30) Foreign Application Priority Data
Dec. 21, 2018   (WO) ............... PCT/EP2018/000581

(51) Int. Cl.
*E04B 1/82*  (2006.01)
*B32B 3/26*  (2006.01)
(Continued)

(52) U.S. Cl.
CPC ............... *E04B 1/86* (2013.01); *B32B 3/266* (2013.01); *B32B 5/073* (2021.05); *B32B 7/14* (2013.01);
(Continued)

(58) Field of Classification Search
CPC ..... E04B 2001/8433; E04B 2001/8476; E04B 2001/8461; E04B 2001/848;
(Continued)

(56) References Cited

U.S. PATENT DOCUMENTS 1,554,179 A * 9/1925 Trader ................. E04B 1/86
                                                                     D25/155
3,077,945 A    2/1963 Thomas et al.
(Continued)

FOREIGN PATENT DOCUMENTS

EP        0605784 B1 *  6/1997
JP        S58-166783 U    11/1983
(Continued)

OTHER PUBLICATIONS

Notification of Reasons for Refusal received for Japanese Application No. 2021-526373, dated Oct. 5, 2022.
(Continued)

*Primary Examiner* — Edgardo San Martin
(74) *Attorney, Agent, or Firm* — Greer, Burns & Crain, Ltd

(57) ABSTRACT

A panel with one or more perforations, having a front surface, wherein the contrast Cm between the front surface and the one or more perforations is less than 0.3, a sound absorbing system including a panel and a masking layer, wherein the masking layer is air permeable, and the use of the panel or the sound absorbing system.

15 Claims, 6 Drawing Sheets

(51) Int. Cl.
  *B32B 5/06* (2006.01)
  *B32B 7/14* (2006.01)
  *B32B 13/12* (2006.01)
  *B32B 27/12* (2006.01)
  *E04B 1/84* (2006.01)
  *E04B 1/86* (2006.01)
  *E04B 1/99* (2006.01)
  *E04B 9/00* (2006.01)
  *G10K 11/162* (2006.01)
  *G10K 11/168* (2006.01)

(52) U.S. Cl.
  CPC .............. *B32B 13/12* (2013.01); *B32B 27/12* (2013.01); *E04B 1/99* (2013.01); *E04B 9/001* (2013.01); *G10K 11/162* (2013.01); *G10K 11/168* (2013.01); *B32B 2255/02* (2013.01); *B32B 2255/12* (2013.01); *B32B 2262/08* (2013.01); *B32B 2307/102* (2013.01); *B32B 2307/724* (2013.01); *B32B 2607/00* (2013.01); *E04B 2001/8461* (2013.01); *E04B 2001/848* (2013.01)

(58) Field of Classification Search
  CPC ...... E04B 2001/8495; E04B 1/86; E04B 1/84; E04B 1/8404; E04B 1/82; E04B 1/99; E04B 9/00; E04B 9/001; G10K 11/168; G10K 11/162; G10K 11/16
  See application file for complete search history.

(56) References Cited

U.S. PATENT DOCUMENTS

| | | | | | |
|---|---|---|---|---|---|
| 3,770,560 | A | * | 11/1973 | Elder | B32B 3/30 428/116 |
| 4,040,213 | A | * | 8/1977 | Capaul | E04B 1/8409 52/316 |
| 4,313,524 | A | * | 2/1982 | Rose | F02C 7/24 181/291 |
| 4,744,189 | A | * | 5/1988 | Wilson | B44C 7/022 434/421 |
| 4,830,140 | A | * | 5/1989 | Fridh | B32B 7/14 181/294 |
| 5,009,043 | A | * | 4/1991 | Kurrasch | E04B 1/8227 181/290 |
| 5,144,786 | A | | 9/1992 | Pacione | |
| 6,220,388 | B1 | * | 4/2001 | Sanborn | E04B 9/0457 181/290 |
| 6,334,280 | B1 | | 1/2002 | Frappart et al. | |
| 6,675,551 | B1 | * | 1/2004 | Fuchs | G10K 11/172 52/145 |
| 6,789,646 | B2 | * | 9/2004 | Wang | G10K 11/168 181/294 |
| 8,100,226 | B2 | * | 1/2012 | Cao | E04B 1/86 181/292 |
| 8,770,345 | B2 | * | 7/2014 | Dugan | E04B 9/001 181/291 |
| 10,024,056 | B2 | * | 7/2018 | Pacione | E04F 15/02016 |
| 10,378,215 | B2 | * | 8/2019 | Drochon | A44B 18/0015 |
| 10,480,184 | B2 | | 11/2019 | Berneth et al. | |
| 2007/0102237 | A1 | | 5/2007 | Baig | |
| 2007/0186493 | A1 | * | 8/2007 | Baig | E04B 9/001 181/284 |
| 2014/0000978 | A1 | * | 1/2014 | Dugan | E04B 9/001 181/290 |
| 2015/0144421 | A1 | * | 5/2015 | Becker | B32B 9/04 181/290 |
| 2017/0081843 | A1 | * | 3/2017 | Berneth | G10K 11/16 |
| 2020/0027436 | A1 | * | 1/2020 | Shackleford | E04B 9/045 |
| 2022/0056687 | A1 | * | 2/2022 | Holfelder | B32B 5/073 |

FOREIGN PATENT DOCUMENTS

| | | | |
|---|---|---|---|
| JP | H10-193503 A | | 7/1998 |
| JP | 2002227323 A | * | 8/2002 |
| JP | 2004076463 A | * | 3/2004 |
| JP | 3120833 U | * | 4/2006 |
| JP | 2013011161 A | | 1/2013 |
| JP | 2014091976 A | * | 5/2014 |
| RU | 2639213 C2 | | 12/2017 |
| WO | 2020126068 A1 | | 6/2020 |

OTHER PUBLICATIONS

International Search Report and Written Opinion received for PCT/EP2019/000347, mailed Mar. 17, 2020.
Ecology Handbook, "Hydraulic resistance of filters," The Wayback Machine, retrieved from: https://web.archive.org/web/20160714224042/ https://ruecology.info/term/15447/, on Feb. 23, 2022, 2 pages. (English Machine Translation provided).
Communication received for European Application No. 19835232. 0, dated Dec. 21, 2023.

* cited by examiner

PANEL, SYSTEM, AND USE FOR CONCEALING SOUND ABSORBING SURFACE AND METHOD OF PRODUCING OF THE SAME

This application claims the benefit of international patent application PCT/EP2018/000581, filed Dec. 21, 2018, which is hereby incorporated by reference in its entirety, and in particularly with reference to specific embodiments and features as described below.

BACKGROUND

A key factor used to indicate room acoustics is reverberation time. Reverberation time refers to the amount of time required for a sound to fade away inside an enclosed space. Sounds inside a room may reverberate when sound waves fail to be absorbed by surfaces they come into contact with, instead reflecting off said surfaces inside the enclosed space.

This reverberation time can be reduced by modifying surfaces such that sound in a relevant frequency range is absorbed more, and the reflections are hence minimised. An open-pored, acoustically absorbent material such as mineral fibre/wool, polyester fibre or felt may be utilized for this effect.

For the improvement of room acoustics in the required environments, sound absorbing materials such as these may be utilized on wall, ceiling, and even floor surfaces. These sound absorbing materials may be sold with a finished surface such as mineral fibre ceilings, or the surface may be produced during the installation of these materials, for example on a perforated plasterboard ceiling which is attached to a suspension system of metal profiles or wooden slats with mineral wool backing.

Perforated surfaces of sound absorbing material allow air to flow through the material and increase the sound absorbing surface. The holes provide sound dampening properties that can be utilised in the acoustic management of a room. Said holes can provide acoustic dampening effects to the environment in which they are installed. These holes may have any one of a variety of shaped cross section, such as rectangular, square or circular. As the holes in the material, panel or board play a large part in providing the noise dampening effects of the material, hole distribution and size can thus be selected to provide the required sound dampening effects for a chosen environment.

Example of a perforated surface is the Knauf Cleaneo Akustikplatte (acoustic board). The best sound dampening effect may be achieved by the complete system, including perforated plasterboards with laminated film or fibre fleece on the side facing towards the wall or ceiling, and with mineral wool behind. The structure also includes fastening means or attachment elements for attaching the boards to the wall or ceiling.

Perforated sound absorbing panels, such as the Knauf Cleaneo Akustikplatte or the Knauf Cleaneo Acoustic linear panels can be suspended from a ceiling, whilst mineral fibre panels are often held in place via a grid-like railing structure, which surround the edges of the individual panels. The sound absorbing material can be laid out in a manner that substantially conceals the edges and makes the surface look like a plain wall or ceiling.

However, an undesirable effect remains that the perforated surface has a large number of visible holes. Usually, these holes appear rather dark (sometimes even black) for the observer, especially, if the front surface of the ceiling is white (which is very often the case). A solution to cover the visible holes with a masking layer may lead, depending on the masking layer, to a decrease of the sound absorbing effect, due to the masking layer reducing at least to some extent the airflow into the sound absorbing material. Such a masking layer may be according to the Knauf Cleaneo SYSTEXX system. In this system, a rather expensive light reflecting foil is used to increase the visual masking effect. With this foil, the perforations in the panel should be invisible, at least to some extent. Further, to have advantageous acoustical properties this foil contains a plurality of very small holes.

However, this with many small holes modified light reflecting foil is rather expensive and complicated to handle. Further, once installed it cannot be replaced easily.

In general, the more or thicker layers are needed to mask the holes/perforations, the more the sound absorbing effect decreases.

Thus, there remains the problem to hide or mask the large number of visible holes in an easy and easy replaceable way, e.g. in a sound absorbing ceiling with perforated panels or other locations, where perforated panels are used (e.g. in baffle systems) without cancelling the sound absorbing effect.

A further problem to be solved is an easy replacement of a masking layer on a perforated panel without cancelling the sound absorbing effect.

The problems are solved by the panel according to claim 1, a sound absorbing system according to claim 8, and the use of a panel or a sound absorbing system according to claim 13.

SUMMARY

In particular, the deficiency is solved by a panel with one or more perforations, comprising a front surface, wherein the contrast Cm between the front surface and the one or more perforations is less than 0.3.

Advantages include a reduction of the visible contrast between the perforations and the surface of the panel without using expensive reflective foils and at the same time being able to apply later a masking layer easily and to replace it easily, if desired. Further, such a masking layer may then be thinner than in solution of the state of the art, thereby masking the holes of the panel and not decreasing the sound absorbing characteristics as much as with more or thicker masking layers.

Further, the sound absorbing characteristics of a ceiling comprising the inventive panel are improved compared to a (closed, white) ceiling without a perforated panel although the visual appearance is the same since the perforations are (essentially) invisible.

In a perforated panel, a perforation (or through hole) and a part of the surface of the panel may be alternating. Such a perforated panel has at least some height, so that in any configuration less light (which is considered to arrive from the same side of the panel where the observer is) arrives in the perforations than on the surface of the panel. Thus, there is (in a first approximation) for the observer only one dark and only one bright feature on the panel and they can take up rather similar or comparable fractions of the area. In the explanations of this application, the luminance of the perforation is considered the dark luminance $L_d$. However, configurations are possible, where the perforation is the bright luminance $L_b$, e.g. when the front surface of the panel is completely black, the perforation might have a (slightly) higher luminance than the panel surface.

Thus, the contrast in such a panel can be fittingly expressed as Michelson contrast (also known as the visibility or the modulation). The Michelson contrast is defined as $$C_m = (L_b - L_d)/(L_b + L_b)$$

with $L_b$ and $L_d$ representing the high (here: bright feature; the panel) and low (here: dark feature; the perforation) luminance L. The denominator represents twice the average of the luminances $L_b$ and $L_d$. In general, $C_m$ can refer to the contrast of a (periodic) signal L relative to its average value. If $L_b$ equals $L_d$ then there is no contrast, since the numerator is 0 and thus $C_m=0$.

The luminance L can be measured with a luminance meter e.g. the "Gossen MAYO-SPOT 2 USB M508G". For reasonable results, $L_b$ and $L_d$ should be measured at the same time. The values of Cm are therefore always between 0 and 1.

Further, for matt or soft and diffusely reflecting surfaces, instead of the luminance L the relative luminance Y can be used. Y is defined as 0 for a completely black surface (no light is being reflected) an completely white surface (all light is being reflected). However, if L or Y are used, the absolute values are the same.

To have a sufficiently small contrast between the perforations and the (front) surface of the panel a $C_m$ value of less than 0.3 is advantageous. However, it is even more advantageous, if the $C_m$ value is less than 0.2, preferably less than 0.1, more preferably less than 0.05.

Further, it should be mentioned that the (day)lighting has some influence, too. Thus, in a rather dark room even a rather high contrast of $C_m=0.4$ or more might occur smaller to the observer than it is, due to the reduced lighting. However, for the invention rather bright lighting is preferred which makes it more difficult to mask the perforations in the panel. However, the invention is works also at daylight or (artificial) office light or at any other artificial light for lighting buildings.

In one aspect of the invention, the panel may comprise a panel material, preferably the panel material comprises gypsum, fiberglass, mineral wool or a fibre-gypsum mixture. Thus, the panel may preferably be a plasterboard, a gypsum fibreboard or an insulating panel, more preferably a plasterboard. The panel may preferably have a thickness of less than 30 mm, more preferably less than 20 mm, most preferably less than 15 mm. However, any size and any structure of a panel with perforations can be used for the invention. However, even a panel made out of wood or plastic would be possible.

Preferably, the front surface of the panel may be
the surface of the panel material,
the surface of a front outer layer of the panel, preferably the front outer layer is a cardboard layer or a non-woven, more preferably a cardboard layer,
the surface of a coating layer, preferably paint, wherein the coating layer preferably is applied on the surface of the panel material or on the surface of a front outer layer of the panel, or
the surface of a connection layer, wherein the receiving layer preferably is attached on the panel material or on a front outer layer of the panel.

However, although different materials and/or functions come along with the above mentioned different options of the front surface of the panel, they all fall under the roof of having a contrast $C_m$ of less than 0.3 between them and the perforations. Therefore, it is advantageous that the panel material, the front outer layer, the coating layer and/or the connection layer comprise pigments, preferably dark pigments, more preferably dark grey pigments or black pigments. The different options are described in the following:

If the front surface of the panel is the surface of the panel material, this means that the panel material can have a contrast of less than 0.3 to the perforations of the panel. This is possible, e.g. in a gypsum fibreboard when e.g. dark pigments (e.g. black or grey) are mixed into the mixture which is used to build up the gypsum fibreboard. Thus, any level of luminance, at least a lower level than without dark pigments, can be reached in this way, so that the desired contrast $C_m$ of less than 0.3 can be reached. One advantage here is that no further step in modifying the panel has to be made to reach the desired contrast $C_m$ of less than 0.3, since the panel itself already has a sufficient luminance (or relative luminance) after production.

If the front surface of the panel is the surface of a front outer layer of the panel, this means that the front outer layer can have a contrast of less than 0.3 to the perforations of the panel. This is possible, e.g. in a gypsum plasterboard with a front outer layer, usually a cardboard layer. In the production of perforated plasterboards, the slurry (which is comprising the plaster) is covered, usually on both sides, with a cardboard layer. Thus, apart from a front outer layer there is usually as well a rear outer layer. After drying (and cutting to specific sizes) the perforations in the plasterboard are made. Thus, when the panel is perforated, not only the panel material but as well the cardboard layer is perforated. The cardboard layers used in plasterboards may be produced in any desired colour or brightness. Thus, it is possible to produce cardboard layers having a contrast $C_m$ of less than 0.3 to the perforations of the panel, e.g. by using dark pigments (e.g. black or grey) in the cardboard layer production. However, the same counts for other front outer layers, like e.g. non-wovens. One advantage here is that no further step in modifying the panel has to be made to reach the desired contrast $C_m$ of less than 0.3, since the panel itself already has a sufficient luminance (or relative luminance) after production, due to using a front outer layer, e.g. cardboard or non-woven, as cover.

However, other panels having only a front outer layer (e.g. a non-woven) and no rear outer layer are possible.

If the front surface of the panel is the surface of a coating layer, preferably paint, wherein the coating layer preferably is applied on the surface of the panel material or on the surface of a front outer layer of the panel, this means that the coating layer can have a contrast of less than 0.3 to the perforations of the panel. This can be made simply by painting the panel (which means either the panel material or the cardboard layer is painted) in a dark colour, e.g. grey, preferably dark grey which can be very similar to the colour of the perforations of the panel especially in the mounted state. Here an extra step is necessary. However, the advantage here is that one can decide very late, which paint (colour, brightness, etc.) should be used. Further, almost no thickness is built up with the paint. Further, the coating layer can be applied after the one or more perforations in the panel are made, thus coating (e.g. paint) can be saved. Further, in some cases it can be easier to produce standard panels (e.g plasterboards) without pigments in the outer layer(s) and afterwards coat the front outer layer.

If the front surface of the panel is the surface of a connection layer, wherein the connection layer preferably is attached on the panel material or on a front outer layer of the panel, this means that the connection layer can have a contrast of less than 0.3 to the perforations of the panel. This may be achieved in using a dark material for the connection layer, e.g. a material with pigments, e.g. dark grey or black pigments.

Preferably, the connection layer may comprise plastic, more preferably the connection layer may comprise polypropylene, most preferably the connection layer may consist of polypropylene. More preferably, the connection layer is a plastic foil or a film, most preferably a plastic foil. Particularly preferred is a dark plastic foil, i.e. a plastic foil with dark pigments, so that the connection layer can have a contrast of less than 0.3 to the perforations of the panel. Even more preferred is a dark plastic foil with a thickness of between 0.3 mm and 0.6 mm, preferably between 0.4 mm and 0.5 mm. A preferred grammage may be between 100 $g/m^2$ and 200 $g/m^2$, preferably between 120 $g/m^2$ and 180 $g/m^2$, more preferably between 140 $g/m^2$ and 160 $g/m^2$. Advantages include that plastic foils are cheap, thin and easy to handle.

Such a connection layer can comprise one or more perforations, preferably essentially at the same positions as the panel. Preferably, the connection layer can be attached, preferably glued, on the panel, preferably either on the panel material or on a front outer layer of the panel. Preferably, the connection layer can be attached, preferably glued, on the panel before the perforations in the panel are made, so that the perforations in the panel and in the connection layer preferably can be done in one step. This is advantageous because its safes time in the production process and ensures to have the perforations in the panel and in the connection layer (essentially) at the same position.

Another option is that such a connection layer can comprise a plurality of micro-perforations. These micro-perforations can be made e.g. with a needle roller. With these micro-perforations sufficient airflow is ensured.

In a very preferred embodiment, the connection layer can comprise a plurality of hooks, a plurality of gripable surface elements, preferably loops, or a plurality of mushroom-shaped stems, preferably a plurality of hooks. With anyone of these features, it is possible to attach a masking layer removably to the panel. The hooks, gripable surface elements, preferably loops, or stems can be very small and in a very small distance to each other.

Particularly preferred is e.g. a dark plastic foil, i.e. a plastic foil with dark pigments that comprises a plurality of hooks, a plurality of loops or a plurality of mushroom-shaped stems, preferably a plurality of hooks, so that the connection layer can have a contrast of less than 0.3 to the perforations of the panel.

In general, a plurality is defined as the state of being plural, wherein plural is the opposite of singular. Thus, plurality means any number bigger than 1, i.e. 2, 3, 4, etc. Most often plurality is a huge, almost uncountable number. The skilled person is aware of that. Concerning the hooks, loops, or stems, this means a plurality may be at least 100, preferably at least 200 hooks or loops or stems per $cm^2$ of a layer. In a very preferred embodiment, there are about 300 hooks, loops, or stems per $cm^2$ of a layer. From these numbers the sizes and distances of the hooks or loops or stems to each other may be roughly estimated.

As described before, one goal of the invention is to hide or mask the visible holes or perforations in a panel without losing its sound absorbing function. Thus, the different combinations of the different configurations of the front surface of the panel with one or more perforations as described above and a masking layer will be described in the following.

In this aspect, the present invention concerns a sound absorbing system. The sound absorbing system may comprise a panel as described above and a masking layer. Preferably, the masking layer may be air permeable, at least to some extent, so that a sound absorbing function of the system is ensured.

The masking layer may be attached to the panel either permanently or removably.

If the masking layer is attached permanently to the panel, this may be done by gluing, screwing, nailing or any other permanent fastening system, preferably by gluing. The glue used in the present application can be any glue known to the person skilled in the art for these applications. Preferably, the glue is transparent.

To ensure the air permeability if the masking layer is attached to the panel by gluing, it is preferable to use adhesive dots, which on one hand are sufficient for a stable permanent connection of the masking layer and the panel, and on the other hand leave sufficient airflow through the masking layer to the panel for the sound absorbing function of the system.

A permanent attachment of the masking layer is preferred in those configurations of the panel, wherein the front surface of the panel is the surface of the panel material, the surface of a front outer layer of the panel, preferably the front outer layer is a cardboard layer or a non-woven, more preferably a cardboard layer, or the surface of a coating layer, preferably paint, wherein the coating layer is applied on the surface of the panel material or on the surface of a front outer layer of the panel.

However, a permanent attachment of the masking layer is also possible if the front surface is the surface of a connection layer, wherein the receiving layer is attached on the panel material or on a front outer layer of the panel. This could be the case, if e.g. the connection layer is a (thin) plastic foil with dark pigments.

In the following, the masking will be described in greater detail.

The masking layer may comprise wool, fleece, felt, polyester fleece, any other air permeable material or mixtures thereof, preferably felt.

More preferably the masking layer consists of wool, fleece, felt, polyester fleece, any other air permeable material or mixtures thereof, most preferably felt Further, the masking layer may have a specific thickness. The masking layer may have a thickness of between 0.1 mm and 20 mm, preferably, preferably between 1 mm and 15 mm, more preferably between 2 mm and 8 mm. The thickness of the masking layer is depending on the material of the masking layer, because on one hand efficient sound absorbing properties should be ensured and on the other hand, the invisibility of the holes and the rather dark appearance of the panel should not be visible. E.g., a very fluffy material can be used in a greater thickness than a rather dense material. For felt, e.g. a thickness of 4 mm is desirable to have on the one hand sufficient airflow and on the other hand sufficient invisibility of the (rather dark) front surface.

However, any other air permeable configuration of the masking layer is possible.

Further, it has to be mentioned that the dimensions of the masking layer may have the same dimensions as the panel. This facilitates the mounting of the sound absorbing system, since panel and masking layer can be mounted in one step. However, they do not necessarily have to be same as the dimensions of the panel. Bigger or smaller dimensions are possible. E.g., it might be desirable on one hand to have a rather small piece of masking layer in a specific position on a panel that is known for being predestined to be changed in specific intervals. On the other hand the lower weight of the masking layer compared to the panel gives the option of masking more than the dimension of one panel, e.g. the dimension of two panels, with only one masking layer, that therefore has greater dimensions than the panel.

Further, it should be mentioned that if the masking layer comprises wool, fleece, felt, polyester fleece, any other air permeable material or mixtures thereof, two adjacent masking layers may be joined by felting, preferably using a special tool, e.g. a felting needle.

If the masking layer is attached removably to the panel, this may be done by a hook-and-loop fastener system, a mushroom-shaped stem fastener system or any other removable fastener system, most preferably by a hook-and-loop fastener system.

There are different removable fastener systems. For example, in the hook-and-loop fastener system the hooks engage into the loop and provide the closure mechanism. However, there are many forms and combinations of hook and loop fastener systems as well as self-engaging and single-component technologies, like e.g. the mushroom-shaped stem fastener system. In this system, both sides of fastener system comprise the same geometry, in this case a mushroom-shaped stem. However, any of these systems, which provide a removable attachment of the masking layer at the connection layer, are comprised within the invention.

A removable attachment of the masking layer is preferred in those configurations of the panel, wherein the front surface of the panel is the surface of a connection layer, wherein the connection layer preferably is attached on the panel material or on a front outer layer of the panel.

In one preferred embodiment, the connection layer comprises a plurality of hooks, a plurality of gripable surface elements, preferably loops, or a plurality of mushroom-shaped stems, preferably a plurality of hooks, as already described above. With anyone of these features, it is possible to attach a masking layer removably to the panel. Particularly preferred is e.g. a dark plastic foil, i.e. a plastic foil with dark pigments that comprises a plurality of hooks, a plurality of loops or a plurality of mushroom-shaped stems, preferably a plurality of hooks so that the connection layer can have a contrast of less than 0.3 to the perforations of the panel.

In a very preferred configuration, the connection layer comprises a plurality of hooks and the masking layer may comprise a plurality of loops. Thus, in this configuration the masking layer may comprise wool, fleece, felt, polyester fleece, any other air permeable material or mixtures thereof, preferably felt, as already described above. Thus, the masking layer can comprise a plurality of loops or other similar gripable surface elements (which are part of the wool, the fleece, the felt, the polyester fleece, or the any other air permeable material, thus no extra layer is necessary here), so that a stable, but removable connection between the connection layer and the masking layer can be easily established by attaching the masking layer to the connection layer. A further advantageous effect of this combination is that preferably neither the holes nor the rather dark appearance of the panel are visible due to the masking layer.

However, other combinations are possible.

If the connection layer comprises a plurality of gripable surface elements, preferably loops, or a plurality of mushroom-shaped stems, the masking layer may be different than described above: the masking layer may additionally to what is described above comprise an additional layer, which is able to connect or engage with the plurality of gripable surface elements, preferably loops, or the plurality of mushroom-shaped stems. This means the masking layer may additionally comprise an additional layer with a plurality of hooks or a plurality of mushroom-shaped stems. To ensure the sound absorbing function, this additional layer preferably comprises micro-perforations. These micro-perforations can be made e.g. with a needle roller. Preferably, this additional layer may be fixed permanent to the masking layer, more preferably glued to the masking layer, most preferably with adhesive dots.

Preferably, the masking layer may have a flow resistance of between 1 and 20,000 Pa*s/m, preferably between 100 and 1000 Pa*s/m. The masking layer may also comprise a fluorescent whitening agent.

As an alternative (or in addition) to darken the front surface of the panel, the rear side of the masking layer can instead (or in addition) be darkened. However, this darkening is preferably done in a way that the masking layer is still air permeable afterwards. Preferably, the front side of the masking layer 160 may then have another colour as desired for visibility. For instance, the masking layer may be produced in any desirable colour or pattern according to the desired design of the wall or ceiling of the room, such as in bright colour or substantially white, while still being air permeable. In this special case, the front surface (of the panel) actually is the rear surface of the masking layer.

However, best results concerning sound absorbance and invisibility of the holes were achieved in a combination of a perforated plasterboard (i.e. a panel with outer cardboard layers), a connection layer with dark pigments and hooks and a masking layer made of felt, thus comprising loops. A thickness of the masking layer of about 4 mm is preferred.

Further, the sound absorbing system may comprise further sound absorbing material located behind the panel, e.g. in a ceiling construction between panel and structural slab. This further sound absorbing material may be mineral wool. This further sound absorbing material may be in form of a layer and/or air permeable and/or perforated or micro-perforated. Further layers of sound absorbing material may also be part of the sound absorbing system.

Further advantages include that the inventive panel can be mounted independently of a masking layer. However, even with a rather dark appearance, the contrast Cm between the perforations of the panel and its front surface is less than 0.3, so that the perforations are less visible for the observer. However, in a preferred embodiment, the masking layer may be the visible, top layer of the inventive panel, when in use. Advantages include that the masking layer can be changed or renewed (for example if dirty or damaged) or removed for washing, cleaning or modification. The masking layer can have any colour, pattern, painting, or photo printing desired. Advantages with the surface include that the perforations that are needed for efficient sound absorbing properties, are not visible (or not noticeable) though the masking layer, when in use.

The system may further comprise one or more attachment elements (not shown in the figures, but comparable to the attachment elements (8) in the PCT/EP2018/000581), preferably wherein the panel is connected to an external surface (e.g. a ceiling) via one or more attachment elements. The panels are typically more firmly attached to the wall or ceiling than the masking layer is attached to the panel.

The deficiency in the prior art is further solved by use of the panel according to the invention, and/or a sound absorbing system according to the invention, preferably for mounting onto a wall or a ceiling.

The benefits and advantages of the use described herein are equal or similar to the advantages of the herein described panel or system.

The invention will be further described in the following, wherein the specific embodiments do not limit the invention as described in this application in any way.

BRIEF DESCRIPTION OF THE DRAWINGS

In the following, examples of the invention are described with respect to the figures, wherein FIG. 1 outlines a cross section of a panel (100) according to the invention.

DETAILED DESCRIPTION

Figure 1:
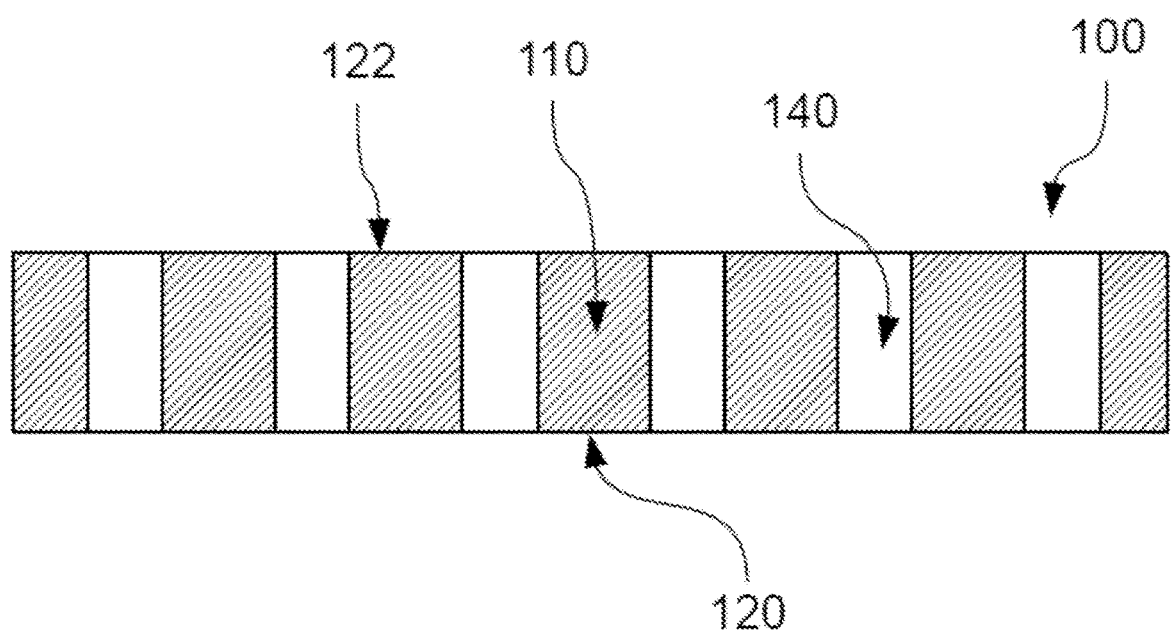

FIG. 1 outlines a cross section of a panel (100) comprising a panel material (110), a front surface (120) and a rear surface (122), wherein the panel (100) has one or more perforations 140, and the perforations extend through the panel material (110), so they could be called through holes, too. The front surface (120) is adapted such that the contrast Cm between the front surface (120) and the one or more perforations (140) is less than 0.3. This may be done by the panel material (110) or a coating layer (not shown, since it will be very thin applied on the panel material (110)) comprising pigments, preferably dark pigments, more preferably dark grey pigments or black pigments. In this example, the panel (100) is a gypsum fibreboard or an insulating panel. Preferably, the panel (100) may have a thickness of less than 30 mm, preferably less than 20 mm, more preferably less than 15 mm.

Figure 2:
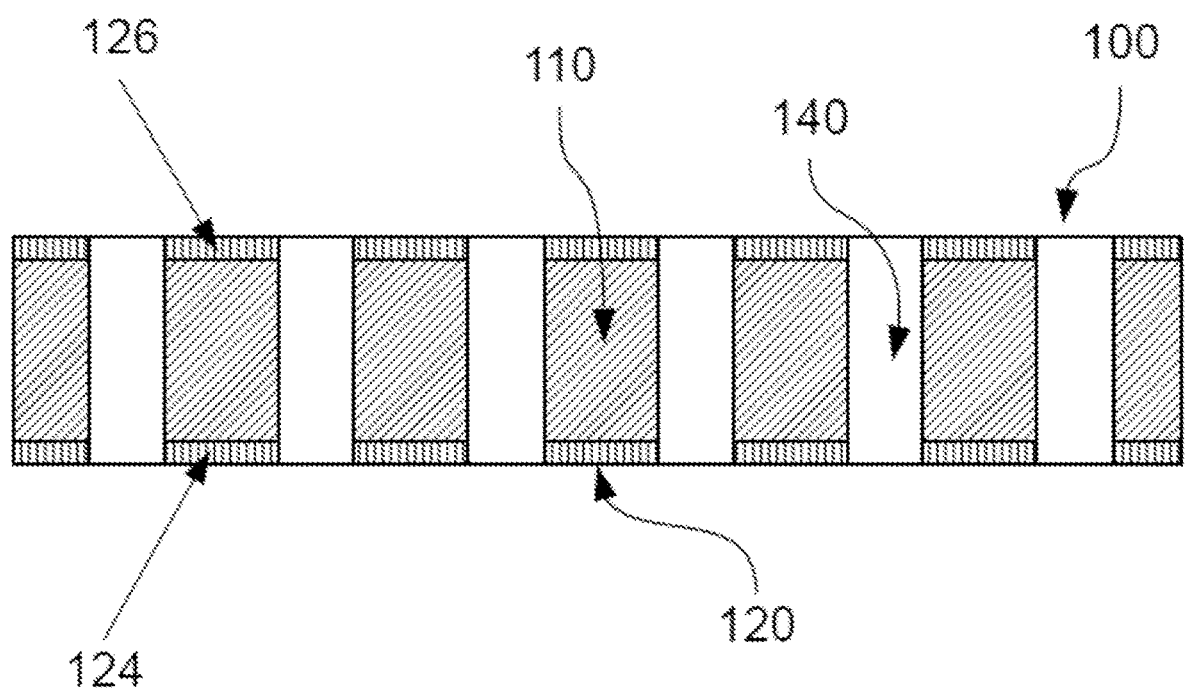
FIG. 2 outlines a cross section of a panel (100) according to the invention with outer layers.

FIG. 2 outlines a cross section of a panel (100) comprising a panel material (110), a front outer layer (124), a rear outer layer (126) and a front surface (120), wherein the panel (100) has one or more perforations (140), and the perforations extend through the panel material (110), the front outer layer (124) and the rear outer layer (126). The front surface (120) is adapted such that the contrast Cm between the front surface (120) and the one or more perforations (140) is less than 0.3. This may be done by the front outer layer (124) or a coating layer (not shown, since it will be very thin applied on the front outer layer (124)) comprising pigments, preferably dark pigments, more preferably dark grey pigments or black pigments. In this example, the panel (100) is a gypsum plasterboard. Preferably, the panel (100) may have a thickness of less than 30 mm, preferably less than 20 mm, more preferably less than 15 mm.

Figure 3:
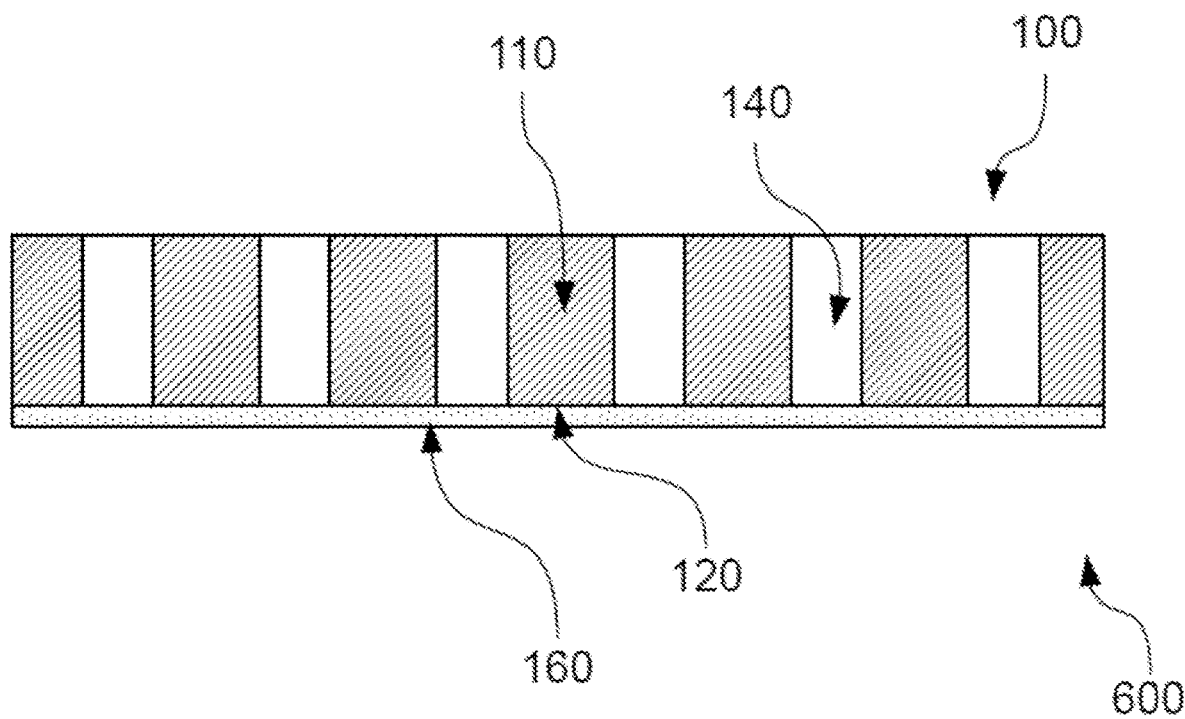
FIG. 3 outlines a cross section of a sound absorbing system (600) according to the invention.

FIG. 3 outlines a cross section of a sound absorbing system (600) according to the invention. The figure discloses a panel (100) according to FIG. 1 and masking layer (160).

The masking layer (160) is attached permanently by gluing (not shown) on the panel material (110) or on the coating layer (not shown), preferably with adhesive dots. Here, either the panel material (110) or the coating layer (not shown) comprise the front surface (120). Due to the masking layer (160) covering both, the perforations (140) and the front surface (120), which have a contrast $C_m$ to each other of less than 0.3, the result is a system with good sound absorbing properties and in which the perforations in the panel are not visible for the observer. The masking layer (160) is air permeable and allows airflow, such as by comprising wool or felt. The flow resistance may be between 1 and 20,000 Pa*s/m. Due to the darkened front surface (120) the masking layer can be made thinner (and less opaque) with the same masking effect, leading to an improved air permeability of the masking layer and thus to a better sound absorbing performance of the whole system. Preferably, the masking layer is made of felt with a thickness of 4 mm.

Figure 4:
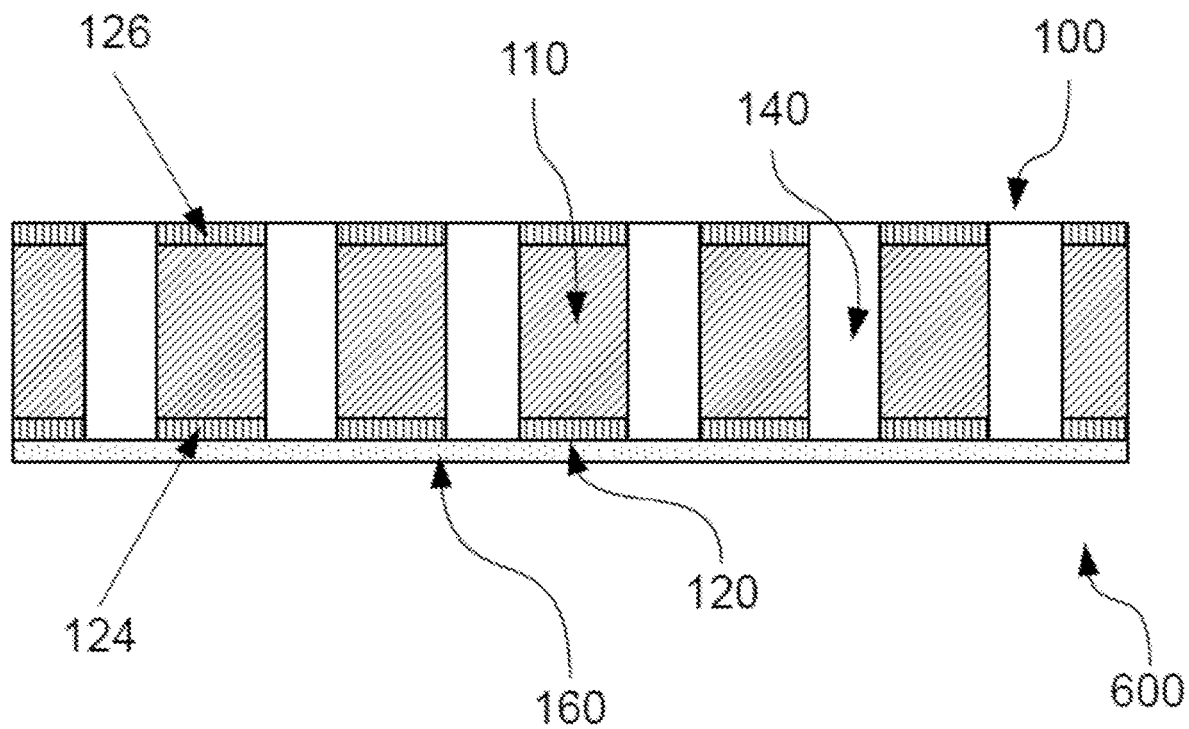
FIG. 4 outlines a cross section of a sound absorbing system (600) according to the invention with outer layers.

FIG. 4 outlines a cross section of a sound absorbing system (600) according to the invention. The figure discloses a panel (100) according to FIG. 2 and masking layer (160).

The masking layer (160) is attached permanently by gluing (not shown), preferably with adhesive dots, on the front outer layer (124) or on the coating layer (not shown), which may be applied on the front outer layer (124). Here, either the front outer layer (124) or the coating layer (not shown) comprise the front surface (120). Due to the masking layer (160) covering both, the perforations (140) and the front surface (120), which have a contrast $C_m$ to each other of less than 0.3, the result is a system with good sound absorbing properties and in which the perforations in the panel are not visible for the observer. The masking layer (160) is air permeable and allows airflow, such as by comprising wool or felt. The flow resistance may be between 1 and 20,000 Pa*s/m. Due to the darkened front surface (120) the masking layer can be made thinner (and less opaque) with the same masking effect, leading to an improved air permeability of the masking layer and thus to a better sound absorbing performance of the whole system. Preferably, the masking layer is made of felt with a thickness of 4 mm.

Figure 5:
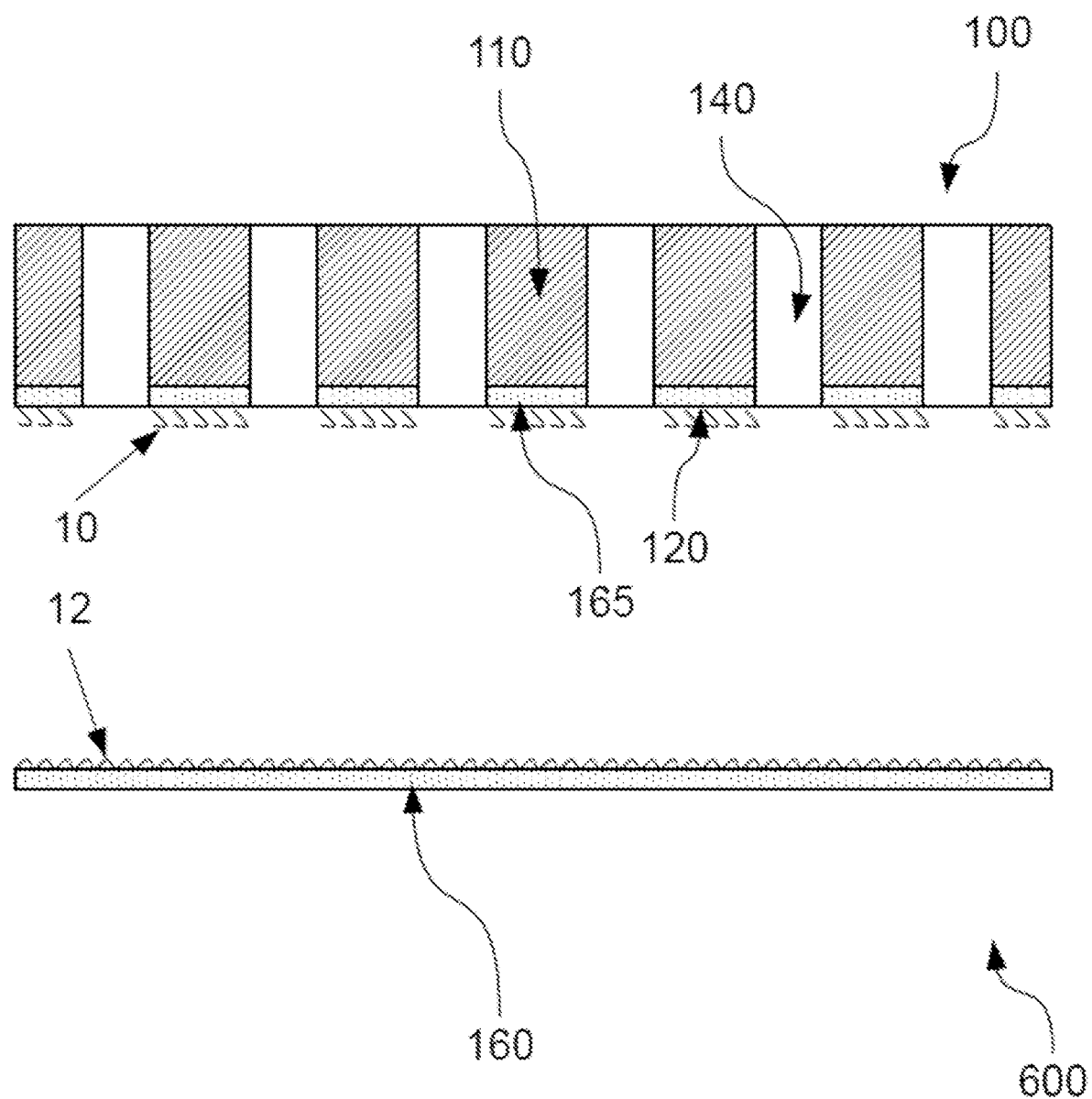
FIG. 5 outlines a cross section of a sound absorbing system (600) according to the invention with a hook-and-loop-fastener system.

FIG. 5 outlines a cross section of a sound absorbing system (600) according to the invention with a hook-and-loop-fastener system. The figure discloses a panel (100) according to FIG. 1 with a connection layer (165) and masking layer (160). The connection layer (165) is a plastic foil with a plurality of hooks (10). The connection layer (165) is attached permanently by gluing (not shown) on the panel material (110), preferably with adhesive dots. Further, the connection layer (165) comprises perforations (essentially) at the same positions as the panel has its perforations (140). The masking layer (160) may be made of wool, fleece, felt, polyester fleece, any other air permeable material or mixtures thereof. As mentioned above, these materials already comprise a plurality of gripable surface elements, preferably loops (12), which are shown big (counts as well for the hooks (10)) in relation to the rest for clarification in this figure. Here, the connection layer (165) comprises the front surface (120). Due to the masking layer (160) covering both, the perforations (140) and the connection layer (165), which have a contrast Cm to each other of less than 0.3, the result is a system with good sound absorbing properties and in which the perforations in the panel are not visible for the observer. The masking layer (160) is air permeable and allows airflow, such as by comprising wool or felt. The flow resistance may be between 1 and 20,000 Pa*s/m. Due to the darkened front surface (120) the masking layer can be made thinner (and less opaque) with the same masking effect, leading to an improved air permeability of the masking layer and thus to a better sound absorbing performance of the whole system. Preferably, the masking layer is made of felt with a thickness of 4 mm.

The hook-and-loop-fastener system is described further herein and in the priority application PCT/EP2018/000581, alternatively or additionally to the use of glue, such as with adhesive dots. In the priority application, the panel (2) may be equal to the panel (100), the receiving surface (4) may be equal to the front surface (120), preferably in the case where front surface (120) is the surface of connection layer (165), and the removably attachable layer (6) may be equal to masking layer (160), the hooks (10) may be equal the hooks (10) and the gripable surface elements (12) may be equal the gripable surface elements (12).

The masking layer (160) should stick to the panel (100) well enough not to fall off. However, it is preferable that the masking layer (160) does not stick harder than the masking layer (160) can be removed without tearing it and/or the panel from its connection to the wall or ceiling and/or without requiring too much force for manual handling.

Through the complimentary hook and gripable surface elements connection or hook-and-loop-fastener system, the masking layer (160) is attached such that it can easily be removed, allowing for greater flexibility of the system. This means said layer may be removed or replaced for repairs, and can also be swapped or customized in light of user preferences. The hook and gripable surface elements connection may preferably be in the form of hook-and-loop fastener.

Figure 6:
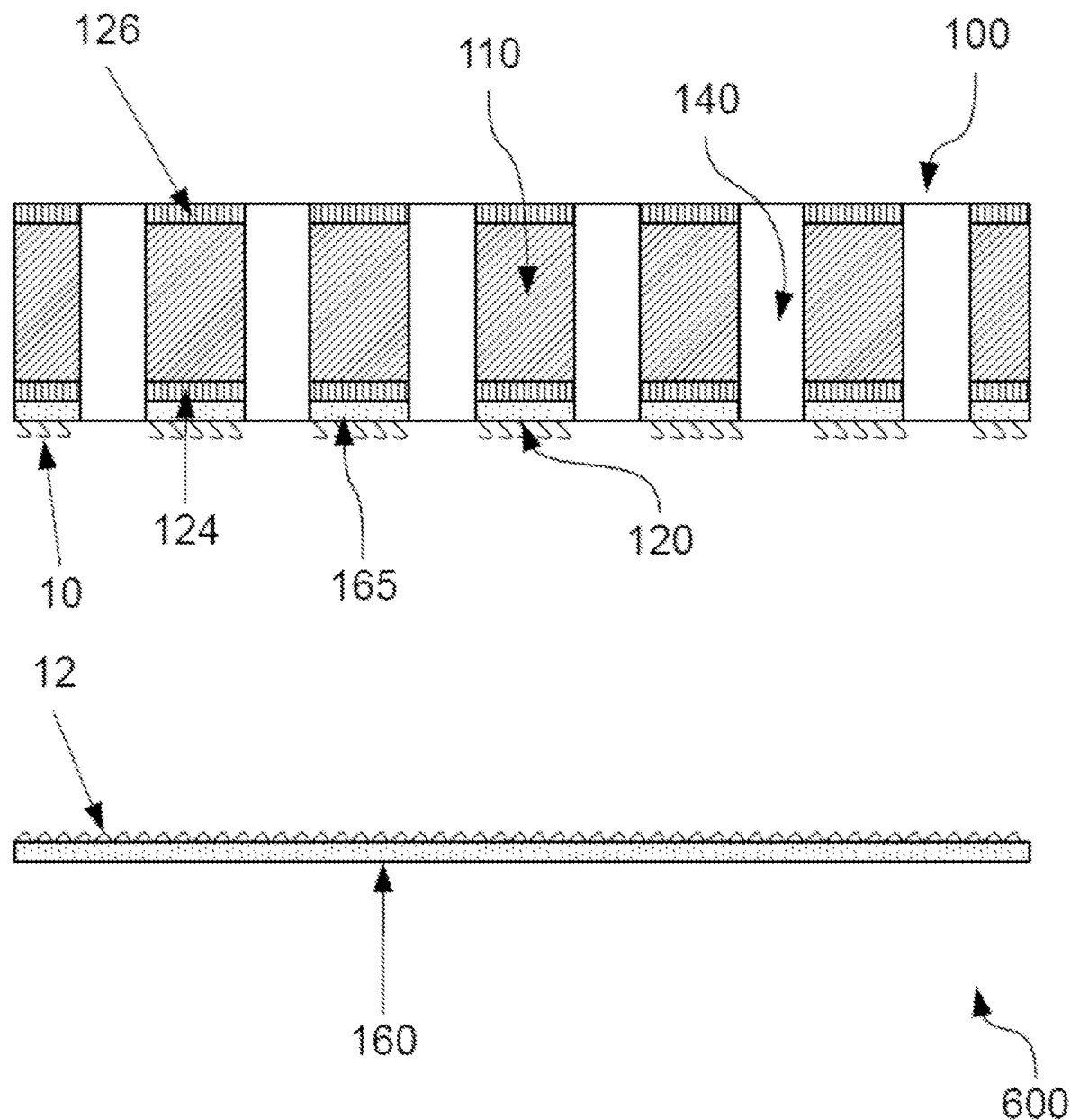
FIG. 6 outlines a cross section of a sound absorbing system (600) according to the invention with outer layers and a hook-and-loop-fastener system.

FIG. 6 outlines a cross section of a sound absorbing system (600) according to the invention with a hook-and-loop-fastener system. The figure discloses a panel (100) according to FIG. 2 with a connection layer (165) and masking layer (160). The connection layer (165) is a plastic foil with a plurality of hooks (10). The connection layer (165) is attached permanently by gluing (not shown) on the front outer layer (124), preferably with adhesive dots. Further, the connection layer (165) comprises perforations (essentially) at the same positions as the panel has its perforations (140). The masking layer (160) may be made of wool, fleece, felt, polyester fleece, any other air permeable material or mixtures thereof. As mentioned above, these materials already comprise a plurality of gripable surface elements, preferably loops (12), which are shown big (counts as well for the hooks (10)) in relation to the rest for clarification in this figure. Here, the connection layer (165) comprises the front surface (120). Due to the masking layer (160) covering both, the perforations (140) and the connection layer (165), which have a contrast Cm to each other of less than 0.3, the result is a system with good sound absorbing properties and in which the perforations in the panel are not visible for the observer. The masking layer (160) is air permeable and allows airflow, such as by comprising wool or felt. The flow resistance may be between 1 and 20,000 Pa*s/m. Due to the darkened front surface (120) the masking layer can be made thinner (and less opaque) with the same masking effect, leading to an improved air permeability of the masking layer and thus to a better sound absorbing performance of the whole system. Preferably, the masking layer is made of felt with a thickness of 4 mm.

Another option (not shown) of FIGS. 5 and 6 may be to have swapped positions of the hooks and the loops in the hook-and-loop-fastener system. Then the masking layer comprises an additional layer with a plurality of hooks. This additional layer preferably comprises micro-perforations to ensure air permeability. Due to the masking layer (160) covering both, the perforations (140) and the connection layer (165), which have a contrast Cm to each other of less than 0.3, the result is a system with good sound absorbing properties and in which the perforations in the panel are not visible for the observer. The masking layer (160) is air permeable and allows airflow, such as by comprising wool or felt. The flow resistance may be between 1 and 20,000 Pa*s/m.

While a particular embodiment of a panel, system, and use for concealing sound absorbing surface and method of producing of the same has been described herein, it will be appreciated by those skilled in the art that changes and modifications may be made thereto without departing from the invention in its broader aspects and as set forth in the following claims.

LIST OR REFERENCES 10 hooks
12 loops/gripable surface elements
100 panel
110 panel material
120 front surface
122 rear surface
124 front outer layer
126 rear outer layer
140 perforation/through hole
160 masking layer
165 connection layer

The invention claimed is:

1. A panel comprising: one or more perforations, and a front surface, wherein the Michelson contrast $C_m$ between the front surface and the one or more perforations is less than 0.3, wherein the Michelson contrast is defined as:

$$C_m = (L_b - L_d)/(L_b + L_d),$$

wherein $L_b$ is the high luminance of the panel and $L_d$ is the low luminance of the one or more perforations.

2. The panel according to claim 1, wherein the Michelson contrast $C_m$ between the front surface and the one or more perforations is less than 0.2.

3. The panel according to claim 1, wherein the panel comprises a panel material, including gypsum, fiberglass, mineral wool or a fibre-gypsum mixture, and wherein the panel is a plasterboard, a gypsum fibreboard or an insulating panel, and wherein the panel has a thickness of less than 30 mm.

4. The panel according to claim 1, wherein the front surface of the panel is one of:
   the surface of the panel material,
   the surface of a front outer layer of the panel which is a cardboard layer or a non-woven layer,
   the surface of a coating layer, wherein the coating layer is applied on the surface of the panel material or on the surface of a front outer layer of the panel, or
   the surface of a connection layer, wherein a receiving layer is attached on the panel material or on a front outer layer of the panel.

5. The panel according to claim 4, wherein the front surface comprises pigments.

6. The panel according to claim 4, wherein the front surface is the surface of the connection layer, and the connection layer comprises plastic.

7. The panel according to claim 4, wherein the front surface is the surface of the connection layer, and the connection layer comprises one or more perforations, or comprises a plurality of micro-perforations.

8. The panel according to claim 4, wherein the front surface is the surface of the connection layer, and the connection layer comprises a plurality of hooks, a plurality of gripable surface elements, or a plurality of mushroom-shaped stems.

9. A sound absorbing system, comprising a panel according to claim 1 and a masking layer, wherein the masking layer is air permeable.

10. The sound absorbing system according to claim 9, wherein the masking layer is attached to the panel permanently.

11. The sound absorbing system according to claim 9, wherein the masking layer comprises wool, fleece, felt, polyester fleece, any other air permeable material or mixtures thereof.

12. The sound absorbing system according to claim 9, wherein the masking layer is air permeable with flow resistance between 1 and 20,000 Pa*s/m.

13. A sound absorbing system according to claim 9, further comprising one or more attachment elements.

14. A use of the panel according to claim 1.

15. The panel according to claim 5, wherein the pigments are dark pigments.

* * * * *